E. FEGRAEUS.
SCIOPTICON APPARATUS.
APPLICATION FILED NOV. 10, 1921.

1,424,457.

Patented Aug. 1, 1922.
3 SHEETS—SHEET 1.

Inventor
E. Fegraeus,
By Marks & Clerk
Attys.

E. FEGRAEUS.
SCIOPTICON APPARATUS.
APPLICATION FILED NOV. 10, 1921.
1,424,457.
Patented Aug. 1, 1922.
3 SHEETS—SHEET 2.
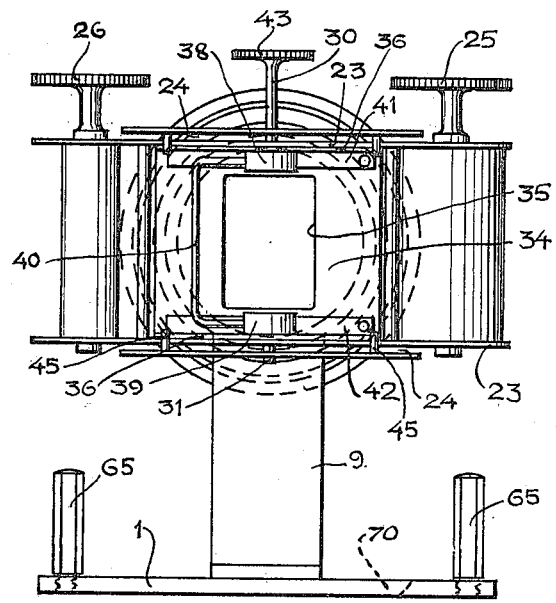
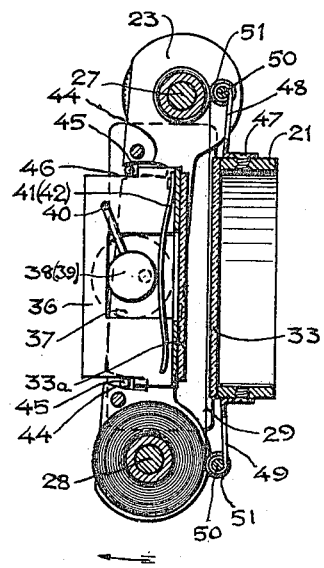
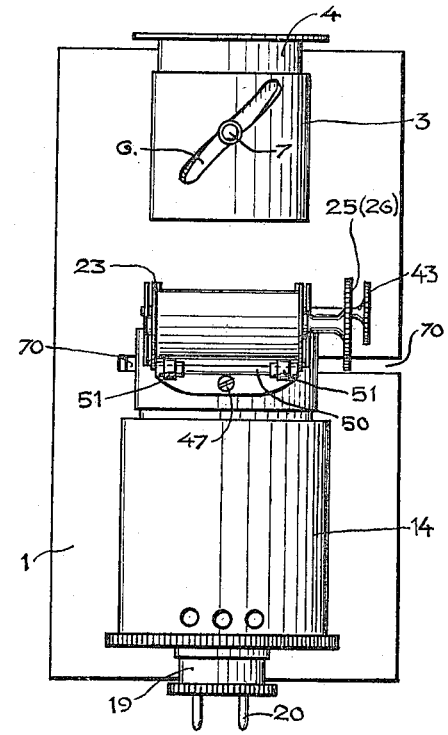
Inventor
E. Fegraeus,
By Marks & Clerk
Attys.

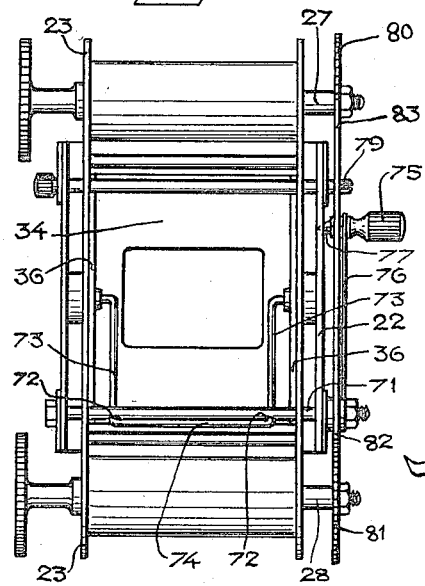
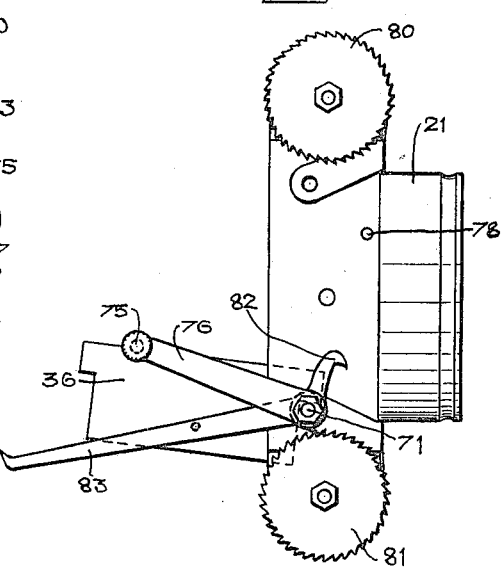
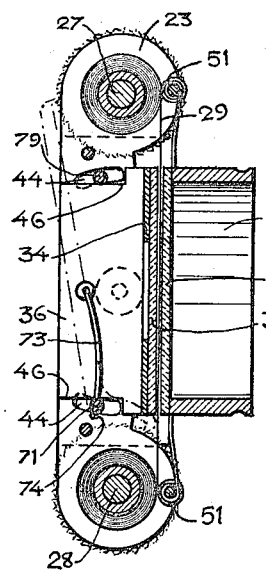
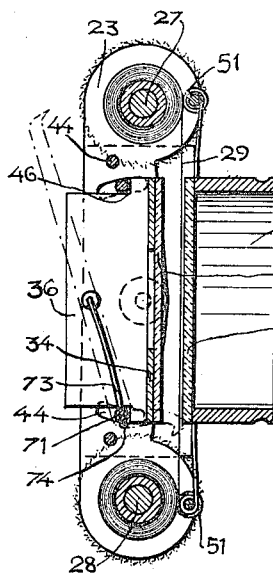
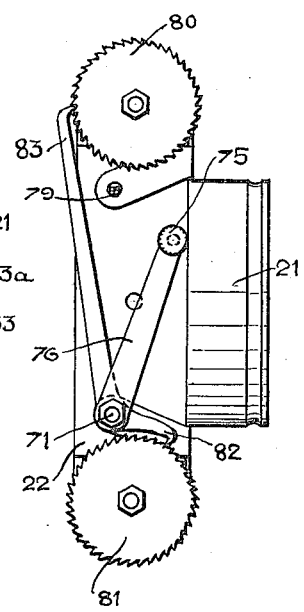

UNITED STATES PATENT OFFICE.

ERNST FEGRAEUS, OF PARTILLO, GOTTENBORG, SWEDEN.

SCIOPTICON APPARATUS.

1,424,457.   Specification of Letters Patent.   Patented Aug. 1, 1922.

Application filed November 10, 1921. Serial No. 514,350.

*To all whom it may concern:*

Be it known that I, ERNST FEGRAEUS, subject of the King of Sweden, residing at Partillo, Gottenborg, county of Gottenborg, Sweden, have invented certain new and useful Improvements in Sciopticon Apparatus (for which I have filed an application in Sweden, Serial No. 4637, filed October 11, 1919), of which the following is a specification.

This invention relates to sciopticon apparatus and has for its principal object to provide an apparatus, which enables the projection of properly placed pictures independently of the position of the picture in the support of the apparatus.

This object can be attained in the use of a support having two rollers or the like upon which spools of a film are wound and rewound, whereby the film is transferred along a straight-lined path in front of the projecting aperture of the apparatus.

Another object of the invention is to provide the first mentioned support of such construction that the straight-lined portion of the film will be disposed always in the proper plane in relation to the support independently of the thickness of the film spools wound on the rollers of the support. By this construction the wear and tear of the film against adjacent parts of the apparatus are avoided.

Another object of this invention is to decrease the heat transmission from the apparatus to the manipulating means of the support in order to facilitate the operating of the same.

Another object of the invention is to design a sciopticon apparatus, the bulk and weight of which is greatly reduced, relatively to such apparatus hitherto known, without reducing the efficiency of the same. Because of this my apparatus can be transported easily which is of particular importance for travelling lecturers or similar users.

Further objects of the invention will be clearly understood by the following description with reference to the accompanying drawings.

Figure 1:
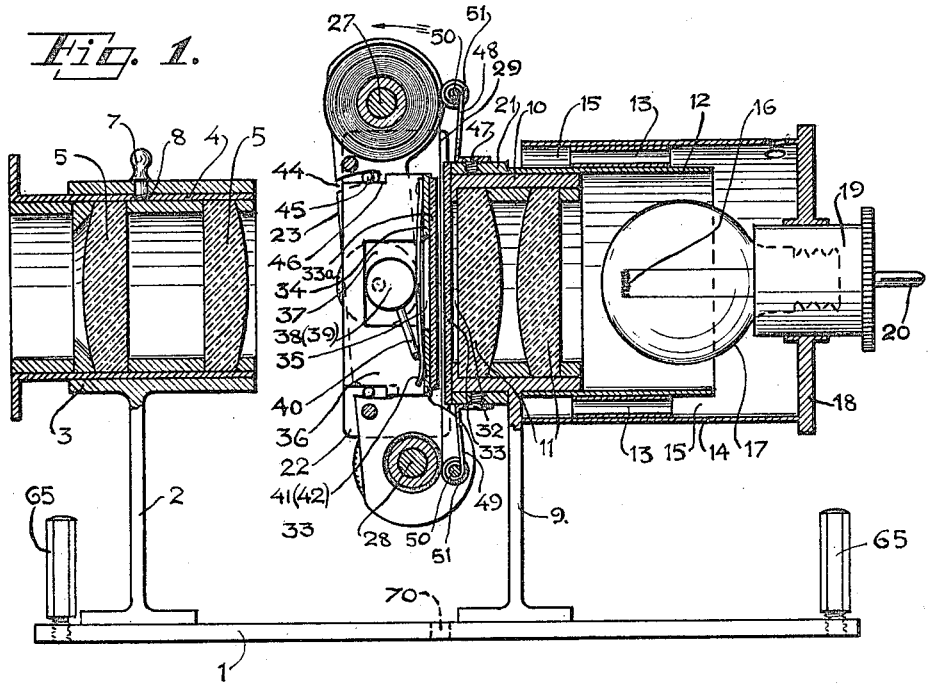
Figure 3:
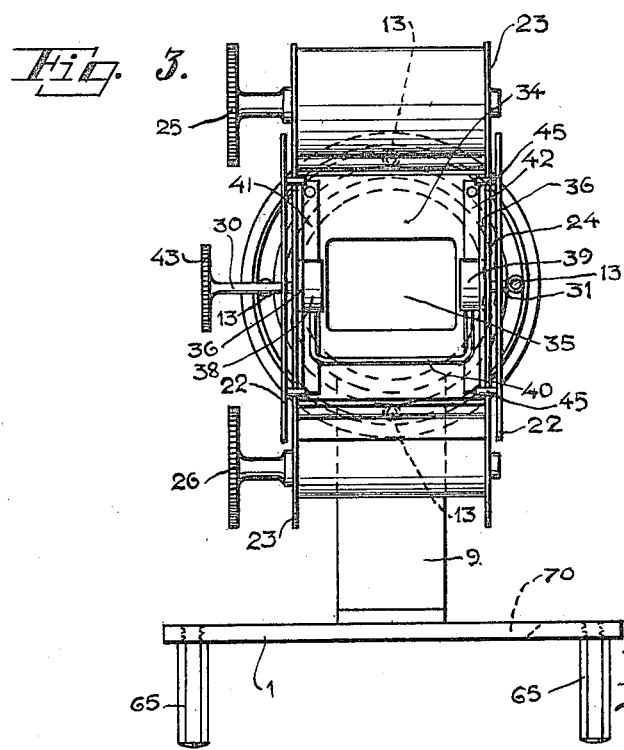

Referring to the drawings, illustrating some embodiments of my invention, Fig. 1 is a longitudinal, vertical sectional view of the entire sciopticon apparatus with a support adapted to transfer a film rectilinearly in front of the projecting lens. Fig. 2 is top plan view of the apparatus with the same support as in Fig. 1. Fig. 3 is a front elevation of the same device with some parts removed. Fig. 4 is a view similar to Fig. 3 but with the support in another operative position than that shown in Figs. 1–3. Fig. 5 is a sectional view of the support shown in Figs 1–4 in a certain operative position. Fig. 6 is a plan view of another embodiment of support for transferring of a film rectilinearly in front of the projecting lens. Fig. 7 is a sectional view of this support in a certain operating position. Fig. 8 is a view similar to Fig. 7 but with the parts of the support in another operative position. Fig. 9 is a side elevation of the same support in the position shown in Fig. 8. Fig. 10 is a view similar to Fig. 9 but with the parts of the support in another operative position.

In the drawings 1 denotes a base-plate, which by means of a bracket 2 carries a stationary socket 3, in which a tube 4 containing two objective lenses 5 is displacable axially. The socket 3 is provided with a thread shaped, obliquely positioned recess or slot 6, through which projects a pin 8 loosely attached to the tube 4 and provided with a knob or head 7. By displacing the pin 8 in the slot 6, the position of the objective tube 4 in the socket 3 can be axially adjusted.

Furthermore, the base-plate 1 carries a bracket 9, supporting a stationary tube 10, which is positioned coaxially to the tube 4 at some distance from the latter in order to enable the disposition within the interspace between said tubes of a support for the pictures to be projected by the apparatus. In the tube 10 are two condensing lenses 11, the optical axes of which coincide with the optical axes of the lenses 5.

On the tube 10 there is loosely fitted a sleeve 12 provided on its exterior with a plurality of longitudinally disposed, tubular members 13 carrying a cylindrical casing 14, so as to form an interspace 15 between the casing 14 and the sleeve 12. The said casing 14 contains a source of light, preferably consisting of a ball-shaped electrical incandescent lamp, the glower 16 of which is disposed adjacent to the front wall of the ball-shaped glass bulb, which should be as smooth as possible to eliminate the point common on incandescent lamps of the usual type. The lamp 16, 17 is fastened to a socket 19 movably attached to the rear wall 18 of the casing 14 and provided with contacts 20, The support on its rear side is provided with a tubular portion or socket 21 with the same internal diameter as the external diameter of the tube 10, so that the socket 21 can be placed on the tube 10 and rotated around the latter. From the socket 21 there project two side-pieces 22 forming a holder for a frame 23, the side-pieces of which, are positioned parallel with and inside the side-pieces 22, and are disposed in such manner, that interspaces 24 of a width of some few millimeters are left between the frame 23 and the side-pieces 22. In the frame 23 there are journalled two rollers 27 and 28 disposed parallel with each other and provided with knobs or handles 25 and 26 respectively. By rotating these knobs or handles a film 29 can be wound or rewound on the rollers 27 and 28. The frame 23 is pivotally fastened to the side-pieces 22 in a similar manner as the lever of a balance by means of pins or pivots 30 and 31, which are disposed in such manner that the axis of the frame lies midway between and parallel to the axes of rotation of the rollers 27, 28.

In front of the projecting aperture 32 of the apparatus a plate 33 of glass or other transparent material is fastened to the socket 21 rearwardly of the film 29. When the image is to be projected the film must be quite smooth in front of the projecting aperture and for this purpose a plate 34 of metal or similar material is provided within the frame 23 and in front of the transparent plate 33, the said plate 34 having an opening 35 of a size corresponding to the size of the pictures on the film. This opening is covered by a plate $33^a$ fastened to the rear face of the plate 34 and of a similar transparent character as the plate 33. The plate 34 is provided with two projecting side-pieces 36, which according to the embodiment shown in Figs. 1–5 are formed with recesses 37, in which two eccentrics 38 and 39 fastened to the pins 30 and 31, respectively, are disposed. These eccentrics are connected to one another by means of a crank-shaped member 40 and bear against blade springs 41 and 42 respectively, fastened to the plate 34. The pin 30 is provided with a knob or handle 43, by means of which the eccentrics 38, 39 can be rotated.

When rotating the eccentrics 38, 39 in one direction the said eccentrics, by means of the pressure against the springs 41 and 42, will force the transparent plate $33^a$ against the film running over the likewise transparent plate 33, so that the film becomes smoothed between the plates 33 and $33^a$. By this movement of the eccentrics the crank-shaped member 40 connecting the eccentrics is brought in such a position, that it does not conceal any portion of the picture under projection (see Figs. 1, 3 and 4). When rotating the eccentrics 38, 39 in the opposite direction, the eccentrics by cooperation with the borders of the recesses 37 will move the plate $33^a$ away from the plate 33, so that the film can be transferred freely without wear and tear against any one of said plates.

In the stationary side-pieces 22 there are fastened pins 45 projecting through notches or recesses 44 in the side-pieces of the frame 23, and which pins, in cooperation with recesses 46 in the side-pieces 36 of the plate 34, guide the plates 34 and $33^a$, when these plates are moved to and from the plate 33, so that the plate $33^a$ will always be moved parallelly with the plate 33 and thereby secure the smoothing of the film in front of the projecting aperture.

On two diametrically opposite sides of the socket 21, resilient members 48 and 49 are fastened by means of screws 47. Each resilient member carries a shaft 50 parallel with the rollers 27, 28 and provided with two rotatable rollers 51, which bear against the borders of the film wound on the rollers 27, 28.

When the film is being wound on one roller (for instance the roller 27 in Fig. 1 and 28 in Fig. 5) and unwound from the other roller (28 and 27 respectively), the radius of the film spool wound on the first mentioned roller increases while the radius of the film roll on the latter roller simultaneously decreases so that the frame 23 because of the pressure exerted by the rollers 51 upon the film is swung correspondingly in the direction indicated by the arrow in Figs. 1 and 5. On account of this fact, the rollers 51 operate always substantially in the same mutual plane and consequently the non-wound portion of the film between the rollers 27, 28 is disposed always in a distinct plane in front of the projecting aperture independently of the thickness of the film rolls wound on the rollers.

On account of the support being rotatable about the lens tube 10, images can be projected in proper position if the direction of their height coincides with the length direction of the film (vertical images), as assumed in Figs. 1–3, as well as if the direction of their height be perpendicular to the length direction of the film (horizontal images) as exemplified in Fig. 4.

The embodiment of the support represented in Figs. 6–10 shows in all essentials the same characteristic features as the one just described, since also this support is provided with rollers 27, 28 rotatable in a frame 23, which similar to the lever of a balance, is pivotably suspended between two side-pieces 22 carried by a socket-shaped member 21, which can be rotatably fitted up on the tube 10. Also the support according to the embodiment now being described is provided with spring-actuated rollers 51, which cause the film 29 always to be transferred in the same plane regardless of the thickness of the film rolls wound on the rollers 27 and 28. The support shown in Figures 6 to 10 inclusive, however, differs from the one previously described with respect to the means, by which the plate 34 is operated. According to the figures just mentioned, a shaft 71 parallel with the rollers 27, 28 is journalled in the frame 22, the said shaft passing through arc-shaped holes 44 in the frame 23, so as not to prevent the rotation of the frame 23 when the mutual relation of the thickness of the film rolls wound on the rollers 27, 28 is altered. The shaft 71 or the portion thereof which is positioned within the frame 23, is provided with two bores 72, through which are inserted the shanks 73 of a resilient guard, preferably made of wire, the middle portion 74 of which is disposed along the shaft 71. The ends of the resilient shanks 73 are fastened to the side pieces 36 projecting from the plate 34. On one end of the shaft 71 and positioned outside the frame 22 there is a resilient lever 76 with a handle 75 carrying at its inner end a head or point 77, which by the resilient action of the said lever is forced against the adjacent side piece 22. Said side piece is provided with a hole 78 adapted to receive the head 77, so that the shaft 71 can be secured in its position by moving the lever 76 until the head 77 engages the said hole. Owing to this construction, the shaft 71, by means of the resilient shanks 73, forces the plate 34 with the transparent plate 33ª against the stationary plate 33 in the support (see Fig. 10).

By releasing the head 77 from the hole 78 the shaft 71 can be rotated in a counterclockwise direction, whereby it moves the resilient guard 73, 74, so that the latter moves the plate 34 with the transparent plate 33ª away from the plate 33, after which the film can be transferred freely without wear and tear against the plates 33, 33ª (see Figs. 11 and 12).

During its movement to and from the plate 33, the plate 34 is guided by the shaft 71 and a pin 79 loosely fitted in the side pieces 22 parallel with the shaft 71, the said shaft and pin cooperating with slots 46 formed in the side pieces 36 of the plate 34. To accommodate the pin 79, slots 44 are provided in the frame 23 for the same purpose as the slots 44 for the shaft 71.

By removing the pin 79, the part 34, 36 with the plate 33ª may be swung from the support to the point shown in Fig. 13, and this permits the plate 33 as well as the plate 33ª to become accessible from both sides for cleansing.

The embodiment now described is also provided with devices for automatically locking the rollers 27, 28 simultaneously as the film is affixed between the plates 33 and 33ª. The said devices, according to the example chosen, comprise ratchet wheels 80 and 81 fastened on the rollers 27 and 28, respectively, said ratchet wheels cooperating each with a pawl 82 and 83 on the shaft 71 in such a manner, that, when the shaft has been rotated a certain amount to permit the plate 33ª to be pressed against the plate 33 (see Fig. 10), said pawls engage with the corresponding ratchet wheel and, thereby prevent reverse rotation of any of the rollers 27, 28. When rotating the shaft 71 backwards so that the plates 33 and 33ª are removed from each other, the pawls automatically are brought out of engagement from their ratchet wheels, and then the rollers 27, 28 may be rotated in either direction.

The last mentioned device has for its object to prevent, the film from being broken, when on account of carelessness or the like, the rollers 27, 28 are rotated for the transferring of the film, while the film is fixedly held between the plates 33 and 33ª.

The base plate 1 can be mounted upon four legs 65 (Fig. 3), which are detachably fastened to the base plate by means of screw threads and when not used said legs can be unscrewed and fastened temporarily on the upper side of the base plate thus projecting upwardly (see Fig. 1). Hereby the bulk of the apparatus is diminished and its storing is facilitated without any risk of the legs 65 being lost.

Owing to the air interspaces 24 between the side pieces 22 and the frame 23 of the roller support first described, the heat transmission from the apparatus on to the film as well as to the knobs 25, 26, 43 becomes reduced, so that the apparatus can be operated without inconvenience from the heat. For similar reasons the air interspace 15 between the casing 14 for the lamp and the socket 12 has been provided.

I do not limit myself to the embodiments described and shown but want to vary the details of my invention without interfering with the scope of same. For instance the supports may be designed in such manner as to be mounted on the socket 3 surrounding the objective tube 4. Likewise the transparent plate 33ª can be dispensed with and the smoothing of the film be effected by the cooperation of the plate 34 and the stationary transparent plate 33.

What I claim is:

1. In a sciopticon apparatus, the combination of a lens system, a source of light disposed on the rear side of said lens system, and a support provided with a plurality of rotatable parallel rollers for transferring a film, said support being mounted within said system and being pivotally supported by an axis disposed substantially parallel to and arranged between the axes of said rollers.

2. An apparatus as claimed in claim 1 in which the pivotal axis of the support is arranged midway between the axes of said rollers.

3. An apparatus as claimed in claim 1 having resilient members adapted to cooperate with the film rollers mounted on the said rollers so as to maintain the portion of the film under projection in a fixed plane relatively to the support regardless of the thickness of the film rolls wound on the rollers.

4. An apparatus as claimed in claim 1 having spring actuated rollers cooperating with the rolls of film on the spools for maintaining the portion of the film under projection in a fixed plane relatively to the support.

5. An apparatus as claimed in claim 1 having two side pieces mounted within the lens system, and said support being pivotally mounted between said side pieces.

6. An apparatus as claimed in claim 1 having two side pieces arranged within the lens system, said support being pivotally suspended between said side pieces, and spring actuated members connected to said side pieces and cooperating with the borders of the film being wound on said rollers.

7. An apparatus as claimed in claim 1 having a stationary plate disposed in said support and arranged on one side of the portion of the film traveling between the rollers, a movable plate on the opposite side of the same portion of the film, and means for operating said movable plate parallel to said stationary plate for smoothing the film during the projection thereof.

8. An apparatus as claimed in claim 1 having a stationary transparent plate disposed on one side of the portion of the film traveling between the rollers, a movable plate disposed on the other side of the same portion of the film, means to operate said movable plate parallel to said transparent plate, said movable plate being of nontransparent material and having an aperture of a size corresponding to the size of the pictures to be projected, and a second transparent plate covering said aperture.

9. An apparatus as claimed in claim 1 having a stationary transparent plate disposed on one side of the portion of the film traveling between said rollers, a movable plate disposed on the other side of the same portion of the film and cooperating with said transparent plate, and resilient means for operating said movable plate parallel to said transparent plate.

10. An apparatus as claimed in claim 1 having a stationary transparent plate disposed on one side of the portion of the film traveling between said rollers, a movable plate disposed on the other side of the same portion of the film and cooperating with said transparent plate, said movable plate being pivotally mounted upon an axis so disposed that the movable plate can be swung away from the stationary plate to release the film, whereby said stationary plate and movable plate each become accessible from both sides.

11. An apparatus as claimed in claim 1 having a stationary transparent plate disposed on one side of the portion of the film traveling between said rollers, a movable plate disposed on the other side of the same portion of the film and cooperating with said transparent plate, a rotatable shaft connected to said movable plate by means of resilient members to permit said movable plate to be yieldingly forced against said stationary transparent plate as well as to be swung away from said stationary plate.

12. An apparatus as claimed in claim 1 having a stationary transparent plate disposed on one side of the portion of the film arranged between said rollers, a movable plate disposed on the other side of the same portion of the film and cooperating with said plate, a rotatable shaft, resilient members connected to said rotatable shaft and to said movable plate, a hand lever provided on said shaft for turning the same, and means for locking said hand lever when the same is in position to hold said movable plate in contact with said stationary plate.

13. An apparatus as claimed in claim 1 having a stationary transparent plate arranged in the support on one side of the portion of the film traveling between said roller, a movable plate on the opposite side of said portion of the film and cooperating with said stationary plate for smoothing the film, and means for automatically locking said rollers when said film is fixed between said plates.

14. An apparatus as claimed in claim 1 having a stationary transparent plate arranged in the support on one side of the portion of the film traveling between said rollers, a movable plate on the opposite side of said portion of the film and cooperating with said stationary plate for smoothing the film, a shaft for supporting said movable plate to permit the same to be swung away from the stationary plate, ratchets on said rollers, and pawls mounted on said shaft and cooperating with said ratchets, so as to automatically lock said rollers when the film is fixedly secured between said stationary plate and said transparent plate.

15. A sciopticon apparatus including a support, a frame provided with two girders which carry said support, means for suspending said frame upon the tube of a sciopticon apparatus, and rollers carried by said support for transferring a film, said girders being spaced from said support to provide air interspaces for avoiding direct admission of heat from the tube of a sciopticon apparatus onto said girders and rollers.

16. A sciopticon apparatus including a lens system having spaced portions, a support mounted in the space between said portions, rollers carried by said support and adapted to carry the film with which the lens system cooperates, and means for pivotally supporting said support about an axis arranged parallel to the axes of said rollers.

17. An apparatus as claimed in claim 16 including a stationary transparent plate arranged in front of one portion of the lens system and adapted to be engaged by the portion of the film arranged between said rollers, and means for clamping said portion of the film to said stationary plate.

18. An apparatus as claimed in claim 16 in which the lens system includes a tube, and in which the support is provided with a sleeve rotatable about said tube.

In testimony whereof I have affixed my signature in the presence of two witnesses.

ERNST FEGRAEUS.

Witnesses:
SVEN FRIBERG,
GUNNAR BACKER.